Oct. 11, 1966  L. J. ULINE ET AL  3,278,336
FUEL CELL AND ELECTRODE UNIT THEREFOR
Filed May 8, 1961  2 Sheets-Sheet 1
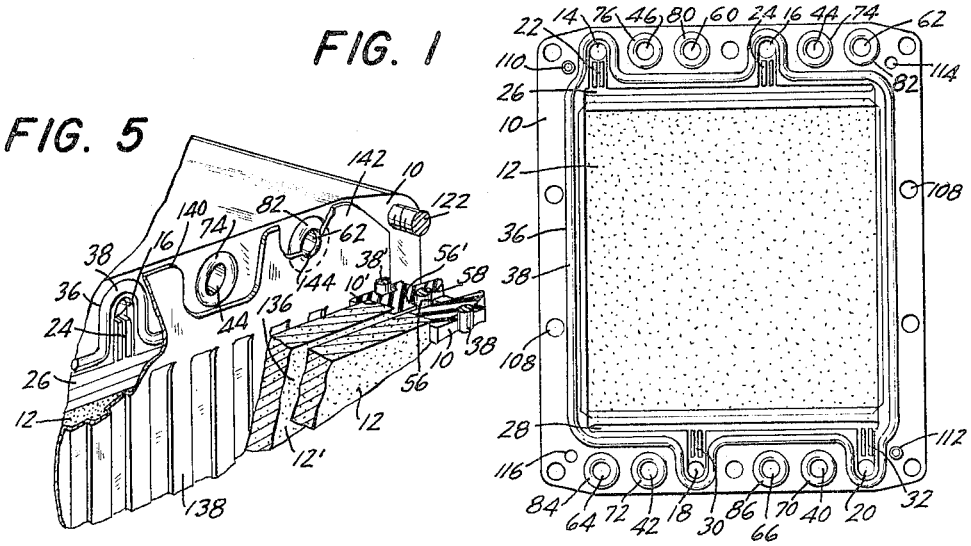
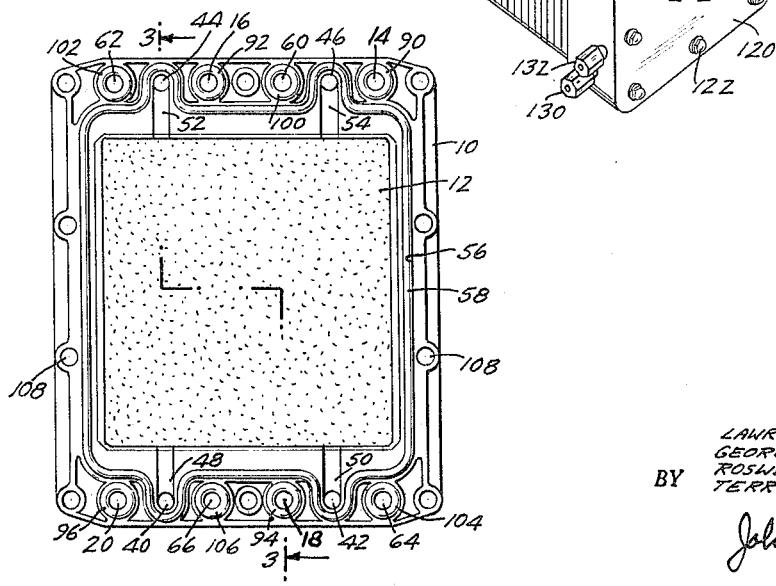
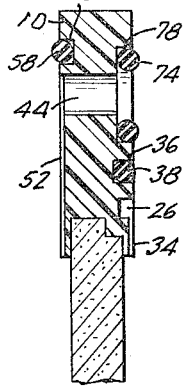
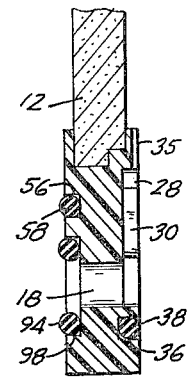
INVENTORS
LAWRENCE J. ULINE
GEORGE R. DRENGLER
ROSWELL J. BENNETT
TERRENCE J. KURTZWEIL
BY John R. Doherty
ATTORNEY

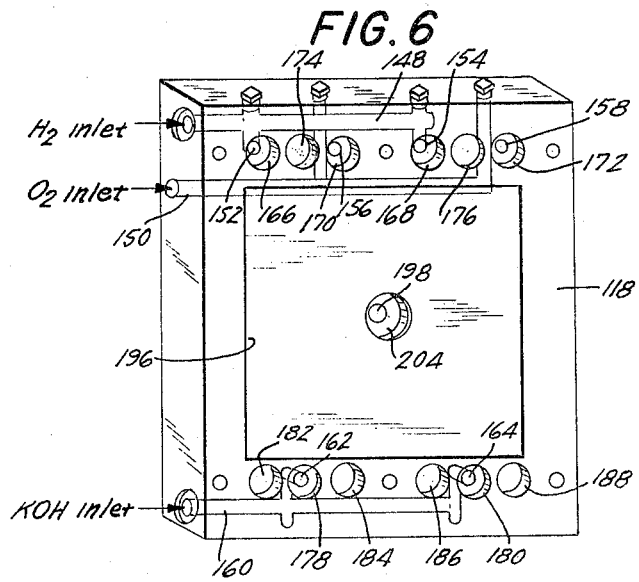
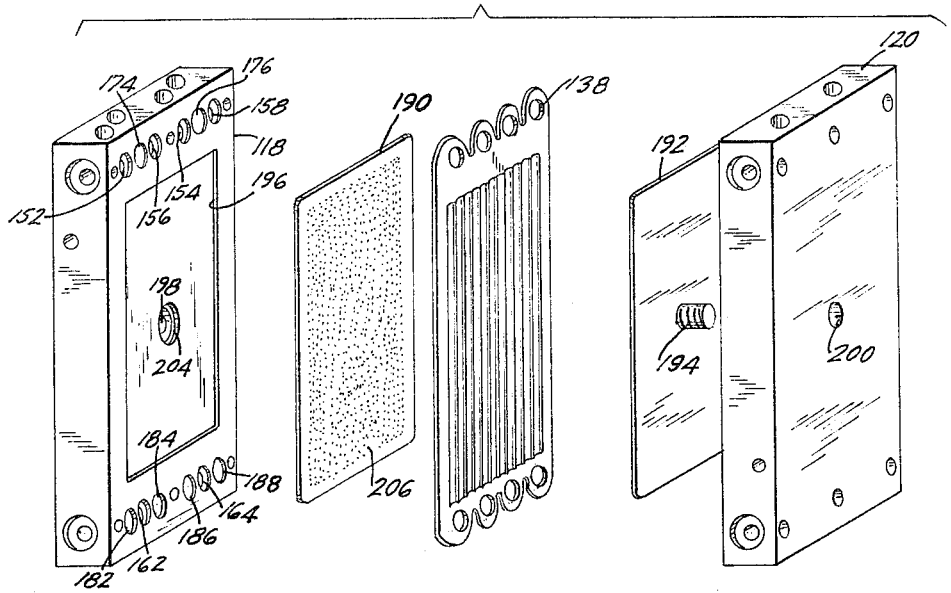

United States Patent Office 3,278,336
Patented Oct. 11, 1966

3,278,336
FUEL CELL AND ELECTRODE UNIT THEREFOR
Lawrence J. Uline, Lakewood, George R. Drengler, Olmsted, Roswell J. Bennett, Lakewood, and Terrence J. Kurtzweil, Avon, Ohio, assignors to Union Carbide Corporation, a corporation of New York
Filed May 8, 1961, Ser. No. 108,400
8 Claims. (Cl. 136—86)

This invention relates to fuel cells and refers more particularly to batteries of fuel cells and to electrode units for such cells and batteries.

The long-time goal of electrochemists of producing electricity directly by the oxidation of a fuel, that is, the provision of a so-called fuel cell has very recently approached practical fruition in a number of developments. One of the most promising of such developments is the hydrogen-oxygen fuel cell in which porous carbon electrodes containing appropriate catalysts are maintained in alkaline electrolyte. Hydrogen gas is supplied to one of a pair of electrodes, and oxygen is supplied to the other electrode of the pair. Such cells have been operated at room temperature for prolonged periods of time with attractive efficiency, producing useful electric power.

Fuel cells of this type have been produced principally in cylindrical form, the electrodes being tubular. While, as indicated, they have performed with promising efficiency, it is the belief that for greatest commercial suitability a flat cell construction that will permit assembly of large batteries of cells is desirable. A great number of problems are encountered in providing a battery of flat fuel cells, such problems including providing for access of fuel gas to one set of electrodes, access of oxidant gas to another set of electrodes, and prevention of access of the gases to the wrong electrodes. Similar problems arise in providing for access of electrolyte to the appropriate surface of electrodes, and one of the most difficult problems is prevention of leakage of electrolyte and gases from the battery. Moreover, the units must be of rugged, relatively inexpensive construction.

It is the principal object of this invention to provide a flat electrode unit for fuel cells which makes possible the construction of a fuel cell battery in which fuel gas and oxidant gas may be supplied to appropriate electrodes and in which electrolyte may be supplied to the desired portions of such electrodes without danger of unwanted inter-mixing of gases and electrolyte. Another object is the provision of a fuel cell battery construction in which no internal piping is required for gas or liquid and in which no soldering, welding or internal wiring is needed for electrical connection between cells. Another object is a fuel cell battery construction in which the possibility of leakage of electrolyte and gas between cells and without the battery is obviated. Still another object of the invention is a construction which is capable of commercial production on a large scale of batteries of a variety of sizes and capacities.

The invention by means of which these objects are achieved will be described with reference to the accompanying drawings in which:

FIG. 1 is a vertical elevation of an electrode unit embodying the invention showing the gas face of the electrode of the unit;

FIG. 2 is a view similar to FIG. 1 but showing the reverse side of the unit, that is, the electrolyte face of the electrode;

FIG. 3 is a vertical section taken along the line 3—3 of FIG. 2 looking in the direction of the arrows;

FIG. 4 is a perspective view of a battery of fuel cells made up of a number of units of the type illustrated in FIGS. 1, 2 and 3;

FIG. 5 is a fragmentary view of a portion of the battery of FIG. 4, parts being broken away to show structural details;

FIG. 6 is an elevation of an end plate of the battery shown in FIG. 4; and

FIG. 7 is an exploded view showing details of the end plate construction for both ends of the battery of FIG. 4.

The invention includes an electrode unit comprising a carbon plate electrode of suitable porosity marginally secured within a frame of an electrically insulating material, for example, a resin such as polystyrene. About the periphery of the frame is provided a plurality of apertures, some of which are for the passage of gas to and away from one face of the electrode and others of which are for passage of electrolyte to and away from the opposite face of the electrode. On each side of the frame communicating with the appropriate apertures are grooves which insure delivery to the desired face of the electrodes of gas or electrolyte as the case may be. The frame of the unit is also provided on each side thereof with a generally peripheral groove for the reception of a sealing O-ring, these grooves extending partially about the apertures so that such apertures lie within the area encompassed by the O-rings. Grooves are also provided on both sides of the frame which completely surround the gas and electrolyte apertures, these grooves being adapted to receive individual O-rings.

The invention also includes a battery of fuel cells made up of a plurality of electrode units arranged with the gas face of electrodes of different polarity adjacent to each other. Electrical contact between cells of the battery is made through a metal conductor element which also serves as a gas partition to insure delivery of the desired gas to the desired electrode face and to prevent intermingling of the gases used.

Referring now to the drawings and particularly to FIGS. 1, 2 and 3, there is illustrated an electrode unit embodying the invention comprising a frame 10 and a carbon plate electrode 12, the gas face of which is shown in FIG. 1 and the electrolyte face of which is shown in FIG. 2. As shall be described in great detail, during assembly of a battery, electrode unit of the type illustrated are secured together with the electrolyte faces of electrodes 12 for each unit positioned adjacent to each other to form individual cells of the battery. For the purpose of conciseness, however, the invention will be described with reference to the construction of a single electrode unit incorporating the anode electrode for one cell of the battery.

As shown in FIG. 1, the frame 10 of an electrode unit of the invention is provided with a plurality of apertures 14, 16 in its upper marginal portion for the introduction of the fuel gas, for example hydrogen, to the gas face of the electrode 12 when the unit is assembled with a number of its kind to form a battery. On the lower marginal portion of the frame 10 are provided apertures 18, 20 for passage of the gas away from the gas face of the electrode 12.

The apertures 14, 16 communicate through a plurality of channels 22, 24 with a lateral groove 26 provided in the upper marginal portion of the frame 10 just adjacent to the gas face of the electrode 12, the channels 22, 24 being defined by ribs embossed in the frame 10. Similarly, in the lower marginal portion of the frame 10 a lateral groove 28 and channels 30, 32 also defined by ribs are provided for passage of the gas out through the apertures 18, 20. The upper and lower marginal portions of the frame 10 between the lateral grooves 26, 28 and the electrode 12 is slightly recessed as indicated at 34, 35 in enlarged detail in FIG. 3, these recesses providing for substantially uniform distribution of the gas over the entire gas face of the electrode 12 from the apertures 14, 16 and for substantially uniform passage of the gas out through the apertures 18, 20.

A generally peripheral groove 36 is provided in the marginal portions of the frame 10 and partially surrounds the apertures 14, 16, 18 and 20, and an O-ring 38 is mounted in the peripheral groove 36. The O-ring 38 provides a seal around the gas face of the electrode 12 and also around the apertures 14, 16, 18 and 20 when the electrode units is assembled into a battery.

The opposite side of the electrode unit incorporating the electrolyte face of the electrode 12 is somewhat similarly constructed as shown in FIG. 2. A plurality of apertures 40, 42 is provided in the lower marginal portion of the frame 10 for the introduction of electrolyte, for example potassium hydroxide solution, to the electrolyte face of the electrode 12, the flow of electrolyte over the electrolyte face of the electrode 12 being countercurrent to the flow of gas over the gas face of the electrode 12. The upper marginal portion of the frame 10 is provided with apertures 44, 46 for passage of the electrolyte out of the battery. The apertures 40, 42 communicate with the electrolyte face of the electrode 12 through vertical channels 48, 50 provided in the frame 10. The upper marginal portion of the frame 10 also is provided with vertical chanels 52, 54 for passing the electrolyte out through the apertures 44, 46, the channel 52 for the apertures 44 being best shown in FIG. 3. For the purpose of sealing the electrolyte face of the electrode 12 when a battery is assembled, a generally peripheral groove 56 having an O-ring 58 partially mounted therein is provided in the marginal portions of the frame 10 partially surrounding the apertures 40, 42, 44 and 46 similarly as illustrated in FIG. 1.

The frame 10 also has provided in its upper marginal portion a plurality of apertures 60, 62 for passing the oxidant gas, for example oxygen, to the gas face of the next adjacent electrode unit in a battery assembly. On the lower marginal portion of the frame 10, apertures 64, 66 are provided for passing the oxidant gas away from the gas face of the next adjacent electrode unit.

On the side of the electrode unit incorporating the gas face of the electrode 12 illustrated in FIG. 1, the apertures 40, 42 and the apertures 44, 46 for the electrolyte in the lower and upper marginal portions of the frame 10 are provided with peripheral recesses and an annular shaped O-ring 70, 72, 74 and 76 is partially mounted therein, the peripheral recess for the aperture 44 being indicated at 78 in FIG. 3. The O-rings 70, 72, 74 and 76 serve to seal the apertures 40, 42, 44 and 46 respectively when the electrode unit is assembled into a battery. The apertures 60, 62 and the apertures 64, 66 for the oxidant gas are similarly provided with peripheral recesses and O-rings 80, 82, 84 and 86 are mounted therein for each of the apertures. The O-rings 80, 82, 84 and 86 differ in that they are mounted substantially flush with the surface of the frame 10 for the purpose of sealing the apertures 60, 62, 64 and 66 as shall be described hereinafter in greater detail.

Referring again to FIG. 2, on the side of the electrode unit incorporating the electrolyte face of the electrode 12, the apertures 14, 16 and the apertures 18, 20 for the fuel gas in the upper and lower marginal portions of the frame 10 are similarly provided with peripheral recesses and O-rings 90, 92, 94 and 96 are partially mounted therein for sealing each of the apertures 14, 16, 18 and 20 respectively, the peripheral recess for the aperture 18 being indicated at 98 in FIG. 3. A plurality of O-rings 100, 102, 104 and 106 is provided on the same side of the electrode unit in peripheral recesses for the apertures 60, 62 and the apertures 64, 66 in the upper and lower marginal portions of the frame 10, these O-rings being partially mounted in the peripheral recesses for sealing the apertures 60, 62, 64 and 66 respectively when the electrode unit is assembled into a battery.

The frame 10 in its marginal portions is also provided with a plurality of substantially equally spaced apertures generally indicated at 108 in FIGS. 1 and 2, these apertures being provided for assembly bolts for securing a number of electrode units into a battery. Also shown in FIG. 1, on the side of the electrode unit incorporating the gas face of the electrode 12 are provided in opposite corners of the frame 10 locating pins 110, 112 and registered holes 114, 116 for receiving similar locating pins on the frame of the next adjacent electrode unit in a battery, thereby assuring proper alignment of the gas faces of the electrodes of each unit when the battery is assembled.

While an electrode unit embodying the invention has been described with particular reference to the hydrogen electrode or anode for a fuel cell, it is to be understood that the electrode unit incorporating the oxygen electrode or cathode for the cell is structurally identical.

A battery of fuel cells made up of electrode units of the invention is shown in FIG. 4. The battery as shown comprises a number of electrode units of the type described properly arranged and stacked together to form a plurality of fuel cells, the electrode units being bolted between a pair of end plates 118, 120 by a plurality of assembly bolts generally indicated at 122.

Gases, for instance hydrogen and oxygen, and electrolyte, for example potassium hydroxide solution, are supplied to the battery through one of the end plates 118 through gas inlets 124, 126 at the top thereof and an electrolyte inlet 128 at the bottom thereof. The gases and electrolyte circulate through the battery and are recovered respectively through gas outlets 130, 132 at the bottom of the other end plate 120 and through an electrolyte outlet 134 at the top thereof. This construction provides for countercurrent flow of the electrolyte and gases through each cell of the battery as before described.

A greatly enlarged detail of a fragmentary section of the battery assembly is shown in FIG. 5. As shown, each cell of the battery is formed by a pair of adjacent electrode units having frames 10, 10' and electrodes 12, 12', the electrode 12 being the anode and the electrode 12' being the cathode for each cell. The electrode units for each cell are arranged with the electrolyte faces of each electrode 12, 12' positioned in opposed spaced apart relation defining therebetween an electrolyte chamber 136. The frames 10, 10' of each cell are sealed against leakage of electrolyte by the O-ring 58 partially mounted within each peripheral groove 56, 56' in the frames 10, 10'.

Between each cell of the battery and fulfilling the dual purpose of making electrical series connection between adjacent cells and of providing a gas partition for insuring delivery of the fuel and oxidant gases separately to each of the adjacent cells is a corrugated metal conductor plate 138. The corrugations on the conductor plate 138 make electrical contact with the gas faces of the electrodes 12, 12' of each adjacent cell and also provide vertical passages on each side of the plate for uniformly distributing the fuel and oxidant gas over the gas faces of the electrodes 12, 12' of the adjacent cells, the fuel gas being introduced through the aperture 16, for example, in the frame 10 of one of the adjacent cells in the construction illustrated.

The metal conductor plate 138 is also provided with a plurality of tabs positioned between the upper and lower marginal portions of the frames 10, 10' of adjacent cells to aid in sealing the gas apertures in each of the frames, tabs 140, 142 of the conductor plate 138 being shown in the construction illustrated in FIG. 5. The tabs 140, 142 overlie the O-rings 38, 82 provided about the gas apertures 16, 62, the tab 142 being provided with an opening indicated at 144 for passage of the oxidant gas to the gas face of the electrode 12' of the next adjacent cell. The O-rings 38, 82 as stated before are mounted substantially flush with the frame 10 of the electrode unit in order to accommodate for the conductor plate 138 and to provide proper sealing for the gas apertures 16, 62, for example, in the frame 10 when the battery is assembled. The O-ring 74 in the construction illustrated is partially mounted in a peripheral recess provided for the electrolyte aperture 44 as already described, and is also partially mounted in the peripheral recess provided for the corresponding electrolyte aperture (not shown) in the frame 10' of the adjacent cell, thereby preventing leakage of electrolyte between cells in the battery assembly. The frames 10, 10' of adjacent cells are sealed against leakage of the fuel and oxidant gases by the O-rings 38, 38' which lie flush against the conductor plate 138 between cells of the battery.

The end plate construction for the battery is shown in FIG. 6. The construction illustrated is for the end plate 118 utlized at the inlet end of the battery, it being understood that the construction for the end plate 120 at the outlet end of the battery is similar providing for counter current flow of electrolyte and gases through the battery. As shown, the top of the end plate 118 is provided with a plurality of conduits as indicated at 148, 150, these conduits communicating respectively with a pair of apertures 152, 154 and 156, 158 for introducing the fuel and oxidant gases to the cells of the battery. Also, as indicated at 160, a conduit at the bottom of the end plate 118 communicates with a pair of apertures 162, 164 for introducing the electrolyte.

For the purpose of sealing the end plate construction against leakage of electrolyte and gases it will be observed that the apertures 152, 154, 156 and 158 in the top of the end plate 118 are respectively provided with peripheral recesses 166, 168, 170 and 172, these recesses being adapted to receive O-rings (not shown) for sealing the apertures when the battery is assembled. Also provided in the top of the end plate 118 for the like purpose are blind holes 174, 176, these holes being adapted to partially receive the O-rings for the registering apertures in the frame 10 of the adjacent electrode unit in the battery assembly similarly as described in the construction illustrated in FIG. 5. At the bottom of the end plate 118, the apertures 162, 164 are provided with peripheral recesses 178, 180 and blind holes 182, 184, 186 and 188, are also provided, the blind holes in this instance being adapted to receive O-rings (not shown) and the peripheral recesses for the apertures 162, 164 being adapted to partially receive the O-rings from the adjacent electrode unit in the battery assembly.

The assembly of end plates 118, 120 for the battery is illustrated in FIG. 7. In the assembly, current collector plates 190, 192 of identical construction are positioned at each end of the battery between the end plates 118, 120 and the metal conductor plate 138 provided for the gas face of the electrode in the unit at each end of the battery stack, only one conductor plate 138 being shown for the purpose of illustration. The collector plates 190, 192 are each provided with a threaded stud secured to the back side thereof, for example by welding, the stud for the collector plate 192 being indicated at 194, and are mounted in rectangular recesses provided in the end plates 118, 120, the recess for the end plate 118 being indicated at 196. The studs 194 for each collector plate 190, 192 pass through apertures 198, 200 in the end plates 118, 120 respectively for providing terminal contacts for the battery and are secured in place by means of a wing nut 202, for example, as shown in FIG. 4. The apertures 198, 200 in the end plates 118, 120 are provided with peripheral recesses for receiving an O-ring (not shown), the recess for the aperture 198 in the end plate 118 being indicated at 204.

The collector plates 190, 192 make contact with the metal conductor plates 138 at each end of the battery stack of electrode units and for the purpose of providing a low resistance electrical connection with each of the conductor plates, the plates 190, 192 preferably are provided on their contacting surfaces with a discontinuous coating of metal as indicated at 206 for the collector plate 190. The collector plates 190, 192 preferably are made of nickel and are preferably coated with nickel particles, for example, by conventional metal spraying techniques.

Thus, the invention provides for the construction of flat electrode units for fuel cells in which fuel and oxidant gas are supplied to the appropriate electrodes and in which electrolyte is supplied to the appropriate portions of the cell without danger of intermixing of the gases and electrolyte by internal leakage within the cell. It will be particularly noted, for example, that the peripheral O-ring seal around the gas and electrolyte faces of each electrode unit and the seal around each of the apertures provided by the annular O-rings mounted in the frame of each unit makes possible the individual sealing of the gas and electrolyte apertures and the gas and electrolyte faces of each electrode unit of the battery.

Another important feature of the invention is the provision of a fuel cell battery in which internal piping and wiring is eliminated. In prior constructions, the electrolyte and gases, for example, have been supplied internally to each cell of the battery through means of piping which suffers from the disadvantage in that the piping has required soldering or welding in the assembly of the battery. The present construction eliminates the need for piping and hence provides a fuel cell battery which is easily constructed and readily assembled during manufacture.

The carbon electrode plates incorporated in the electrode unit of the invention are of a conventional type for fuel cells composed of activated carbon catalyzed by various catalysts on the electrolyte face of the electrode. A typical electrode for a fuel cell is disclosed, for example, in the copending application of K. Kordesch et al., Serial No. 764,359 filed January 22, 1959, now abandoned.

For the purpose of maintaining low resistance electrical connection between the cells of the battery, the gas face of the carbon plate electrode of the electrode unit embodying the invention is preferably provided with a discontinuous coating of metal, for example, nickel. The metal coating may be applied, for instance, by metal spraying techniques as disclosed in the copending application of George R. Drengler, Serial No. 108,364, now abandoned, filed concurrently herewith.

The frame 10 of the electrode unit of the invention is composed of an insulating material suitably a plastic resin of the type which exhibits excellent resistance to attack by the caustic electrolyte utilized for operating the battery. A suitable plastic, for example, is a styrene-acrylonitrile copolymer. This plastic is highly preferred because of its high impact strength and relatively high softening point which is advantageous in the event that the battery is to be operated at elevated temperatures. Other suitable plastics include styrene-butadiene copolymer, polyethylene and polypropylene. The O-rings utilized in the electrode unit may be composed of most any rubber-like material preferably one also having a high resistance to attack by the caustic electrolyte. Buna-N rubber, natural rubber and neoprene are examples of such rubber-like materials which may be used.

Batteries of up to 35 fuel cells composed of 70 electrode units of the invention have been made and operated successively without leakage problems for many hours delivering a useful output of electrical energy.

What is claimed is:

1. An electrode unit for a flat fuel cell which unit comprises: (1) a frame of electrically insulating material and a carbon plate electrode having a gas face and an electrolyte face marginally secured within said frame along the outer edge surface of said electrode and the inner edge surfaces of said frame, said frame having shoulders on both sides thereof and extending beyond both of said electrode surfaces, (2) said frame having spaced about its perpiheral margin between said electrode and the outer edge of said frame at least two electrolyte apertures, at least two fuel gas apertures and at least two oxidant gas apertures, (3) said electrode unit being further charactreized by said electrolyte apertures communicating with channels so constructed and arranged on the electrolyte side of said electrode and frame as to provide access of electrolyte to the electrolyte face of said electrode, a continuous peripheral groove disposed in the electrolyte side of said frame completely surrounding said electrode perimeter, partially surrounding said electrolyte apertures and passing between said electrode perimeter and said fuel gas and oxidant gas apertures, said peripheral groove being adapted to receive a sealing O-ring, (4) said electrode unit being further characterized by one but not both of the following structures (a) and (b), namely (a) said fuel gas apertures communicating with channels so constructed and arranged on the gas side of said electrode and frame so as to provide access of fuel gas to the gas face of said electrode, a continuous peripheral groove disposed in the frame on the gas side of said electrode completely surrounding said electrode perimeter, partially surrounding said fuel gas apertures and passing between said electrode perimeter and said oxidant gas and electrolyte apertures, said peripheral groove being adapted to receive a sealing O-ring, and (b) said oxidant gas apertures communicating with channels so constructed and arranged on the gas side of said electrode and frame so as to provide access of oxidant gas to the gas face of said electrode, a continuous peripheral groove disposed in the frame on the gas side of said electrode completely surrounding said electrode perimeter, partially surrounding said oxidant gas apertures and passing between said electrode perimeter and said fuel gas and electrolyte apertures, said peripheral groove being adapted to receive a sealing O-ring, and (5) the apertures located in said frame between said continuous perpiheral grooves and the outer edge of said frame being adapted to receive sealing O-rings.

2. An electrode unit as defined in claim 1 in which said channel for gas communicates with a lateral groove provided in said frame adjacent to said electrode.

3. An electrode unit as defined in claim 1 in which locating pins are provided on said frame for registering the same with another of its kind when assembling a battery.

4. An electrode unit as defined in claim 1 in which said channel for gas is defined by ribs formed in said frame.

5. A fuel battery comprising (A) a plurality of pairs of individual electrode units each such individual unit having the following structure: (1) a frame of electrically insulating material and a carbon plate electrode having a gas face and an electrolyte face marginally secured within said frame along the outer edge surface of said electrode and the inner edge surfaces of said frame, said frame having shoulders on both sides thereof and extending beyond both of said electrode surfaces, (2) said frame having spaced about its peripheral margin between said electrode and the outer edge of said frame at least two electrolyte apertures, at least two fuel gas apertures and at least two oxidant gas apertures, (3) said electrode unit being further characterized by said electrolyte apertures communicating with channels so constructed and arranged on the electrolyte side of said electrode and frame as to provide access of electrolyte to the electrolyte face of said electrode, a continuous perpiheral groove disposed in the electrolyte side of said frame completely surrounding said electrode perimeter, partially surrounding said electrolyte apertures and passing between said electrode perimeter and said fuel gas and oxidant gas apertures, said peripheral groove being adapted to receive a sealing O-ring, (4) said electrode unit being further characterized by one but not both of the following structures (a) and (b), namely (a) said fuel gas apertures communicating with channels so constructed and arranged on the gas side of said electrode and frame so as to provide access of fuel gas to the gas face of said electrode, a continuous peripheral groove disposed in the frame on the gas side of said electrode completely surrounding said electrode perimeter, partially surrounding said fuel gas apertures and passing between said electrode perimeter and said oxidant gas and electrolyte aperures, said peripheral groove being adapted to receive a sealing O-ring, and (b) said oxidant gas apertures communicating with channels so constructed and arranged on the gas side of said electrode and frame so as to provide access of oxidant gas to the gas face of said electrode, a continuous peripheral groove disposed in the frame on the gas side of said electrode completely surrounding said electrode perimeter, partially surrounding said oxidant gas apertures and passing between said electrode perimeter and said fuel gas and electrolyte apertures, said peripheral groove being adapted to receive a sealing O-ring, and (5) the apertures located in said frame between said continuous peripheral grooves and the outer edge of said frame being adapted to receive sealing O-rings; (B) each pair of electrodes in said battery being arranged with the gas faces of units of opposite polarity adjacent to each other but separated by an embossed gas-impervious metal element disposed across and between said gas faces, some of the bosses of said element extending toward and making physical and electrical contact with one of said electrode faces in said pair and others of said bosses extending in the opposite direction and making physical and electrical contact with the other of said electrode faces in said pair, (C) each electrode unit in said pair having electrolyte face structure, (3) as defined hereinabove, one electrode unit in each pair having gas face structure (4)(a) as defined hereinabove, and the other electrode unit in each pair having gas face structure (4) (b) as defined hereinabove, (D) said metal element having solid smooth surfaced tabs around its perimeter and extending over the fuel gas apertures of the electrode face having structure (4) (a) hereinabove and over the oxidant gas apertures of the electrode face having structure (4) (b) hereinabove, and said metal element having smooth surfaced perforated tabs around its perimeter and extending over the oxidant gas apertures of the electrode face having structure (4)(a) hereinabove and over the fuel gas apertures of the electrode face having structure (4)(b) hereinabove, said perforated tabs having holes registering with the oxidant apertures of electrode face of structure (4)(a) and the fuel gas apertures of electrode face structure (4) (b), (E) said electrode units and said metal elements in each said pair being sealed by O-rings mounted in the continuous perpiheral grooves of the gas faces of the frames and in the oxidant and fuel gas apertures as defined hereinabove, said O-rings being in sealing relation with the smooth peripheral surfaces and tabs of said gas-impervious metal elements, (F) said electrolyte apertures in said gas faces being sealed by O-rings positioned between the tabs in said gas-impervious metal element so that said element is not in contact with electrolyte, and (G) each of said plurality of electrode pairs being sealed to the next adjacent pairs by O-rings mounted in the continuous peripheral grooves, fuel gas apertures and oxidant gas apertures in the electrolyte faces of said electrode units.

6. A fuel cell battery as defined in claim 5 in which said plurality of electrode units is secured together between a pair of end plates, said end plates being sealed to the terminal units of said plurality of electrode units by means of O-rings between said end plates and said terminal units, one of said end plates having electrolyte and gas inlet means and the other of said end plates having electrolyte and gas outlet means, said inlet and outlet means in said end plates being so arranged as to provide for countercurrent flow of electrolyte and gases through said battery.

7. A fuel cell battery as defined in claim 6 in which a collector plate is mounted in electrical contact with said metal element for said electrode units at each end of said battery, and in which said collector plate is provided with a terminal passing through said end plates.

8. A fuel cell battery as defined in claim 5, wherein said embossed metal element is a corrugated metal plate.

References Cited by the Examiner
UNITED STATES PATENTS

| | | | |
|---|---|---|---|
| 2,729,693 | 1/1956 | Waber | 136—83 |
| 2,882,329 | 4/1959 | Liebhafsky | 136—86 |
| 2,914,596 | 11/1959 | Gorin et al. | 136—120 |
| 2,969,315 | 1/1961 | Bacon | 136—86 |
| 3,080,442 | 3/1963 | Hobert | 136—86 |
| 3,126,302 | 3/1964 | Drushella | 136—86 |
| 3,134,696 | 5/1964 | Douglas et al. | 136—86 |

FOREIGN PATENTS

| | | |
|---|---|---|
| 350,100 | 8/1905 | France. |
| 1,250,769 | 12/1960 | France. |

References Cited by the Applicant
FOREIGN PATENTS

| | | |
|---|---|---|
| 1,064,539 | 10/1958 | Germany. |
| 505,698 | 5/1939 | Great Britain. |
| 101,237 | 4/1941 | Sweden. |

WINSTON A. DOUGLAS, *Primary Examiner.*

JOHN R. SPECK, JOHN H. MACK, *Examiners.*

H. FEELEY, *Assistant Examiner.*